US007383382B2

(12) United States Patent  
Powell et al.

(10) Patent No.: US 7,383,382 B2
(45) Date of Patent: Jun. 3, 2008

(54) SYSTEM AND METHOD FOR STORAGE POWER, THERMAL AND ACOUSTIC MANAGEMENT IN SERVER SYSTEMS

(75) Inventors: Therron Powell, Redmond, WA (US); Kenneth W. Stufflebeam, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 338 days.

(21) Appl. No.: 10/823,918

(22) Filed: Apr. 14, 2004

(65) Prior Publication Data

US 2006/0036605 A1   Feb. 16, 2006

(51) Int. Cl.
*G06F 12/00* (2006.01)
(52) U.S. Cl. .................. 711/114; 711/111; 711/112
(58) Field of Classification Search ............. 711/112, 711/114
See application file for complete search history.

(56) References Cited

U.S. PATENT DOCUMENTS

| | | | | |
|---|---|---|---|---|
| 5,493,670 | A * | 2/1996 | Douglis et al. | 713/324 |
| 5,878,020 | A * | 3/1999 | Takahashi | 369/59.25 |
| 6,684,121 | B1 * | 1/2004 | Lu et al. | 700/108 |
| 6,834,326 | B1 * | 12/2004 | Wang et al. | 711/114 |
| 6,901,418 | B2 * | 5/2005 | Gonos | 707/204 |
| 7,010,719 | B2 * | 3/2006 | Nobuyoshi et al. | 714/6 |
| 2002/0004917 | A1 * | 1/2002 | Malcolm et al. | 714/4 |
| 2002/0059440 | A1 * | 5/2002 | Hudson et al. | 709/231 |
| 2002/0097515 | A1 * | 7/2002 | Antonio et al. | 360/73.03 |
| 2003/0065743 | A1 * | 4/2003 | Jenny et al. | 709/219 |
| 2003/0140198 | A1 * | 7/2003 | Ninose et al. | 711/122 |
| 2006/0015946 | A1 * | 1/2006 | Yagawa | 726/32 |

OTHER PUBLICATIONS

Benini, L. et al., "System-Level Power Optimization: Techniques and Tools", *ACM Transactions on Design Automation of Electronic Systems*, Apr. 2000, 5(2), 115-192.
Carrera, E.V. et al., "Conserving Disk Energy in Network Servers", *Proceedings of the 17th Annual International Conference on Supercomputing*, 2003, 86-97.
Chase, J.S. et al., "Managing Energy and Server Resources in Hosting Centers", *ACM SIGOPS Operating Systems Review*, 2001, 35(5), 103-116.

(Continued)

*Primary Examiner*—Sanjiv Shah
*Assistant Examiner*—Jae Un Yu
(74) *Attorney, Agent, or Firm*—Woodcock Washburn LLP

(57) ABSTRACT

A storage power optimized server system includes a high performance spinning hard drive for storing a first set of data and a power controlled hard drive for storing a second set of data. The high performance spinning hard drive is continuously driven while the power controlled hard drive may have a lower power consumption, slower access time or higher capacity than the high performance spinning hard drive. The first and second set of data may be based on one or more data conditions. The first set of data may include data that has been requested at a rate above a predetermined threshold, or after a predetermined file age date, or after a predetermined last access date. The second set of data may include data that has been requested at a rate below the predetermined request rate threshold, or before a predetermined file age, or before a predetermined last access date.

33 Claims, 7 Drawing Sheets

OTHER PUBLICATIONS

Colarelli, D. et al., "Massive Arrays of Idle Disks for Storage Archives", *Proceedings of the 2002 ACM/IEEE Conference on Supercomputing*, 1-11.

Gurumurthi, S. et al., "Interplay of Energy and Performance for Disk Arrays Running Transaction Processing Workloads", *Proceedings of the International Symposium on Performance Analysis of Systems and Software (ISPASS)*, Mar. 2003, 10 pages.

Gurumurthi, S. et al., "DRPM: Dynamic Speed Control for Power Management in Server Class Disks", *ACM SIGARCH Computer Architecture News, Proceedings of the 30th Annual International Symposium on Computer Architecture*, 2003, 31(2), 11 pages.

Irani, S. et al., "Online Strategies for Dynamic Power Management in Systems with Multiple Power-Saving States", *ACM Transactions on Embedded Computing Systems*, Aug. 2003, 2(3), 325-346.

Lelii, S.R., "Firefly Powers Down Disk Drives", http://crn.channelsupersearch.com/news/var/39491.asp, 2 pages.

Ramanathan, D. et al., "Latency Effects of System Level Power Management Algorithms", *Proceedings of the 2000 IEEE/ACM International Conference on Computer-aided Design*, 2000, 350-356.

* cited by examiner

SYSTEM AND METHOD FOR STORAGE POWER, THERMAL AND ACOUSTIC MANAGEMENT IN SERVER SYSTEMS

FIELD OF THE INVENTION

This invention relates in general to the field of server systems. More particularly, this invention relates to power management in server systems.

BACKGROUND OF THE INVENTION

One of the challenges of business operations and continued deployment of information technology is the increasing power demands that the systems require. The ability to supply this increasing power demand may even discourage companies from successfully operating more modern systems that demand more of their infrastructure than previous buildouts can accommodate. Existing datacenter rack density technologies have already eclipsed many corporations' abilities to provision an adequate power and cooling infrastructure. Advancing capabilities in computational systems are consuming electricity with geometrically increasing rates. Heat dissipated by a computer system must be offset by cooling equipment in order to keep the computer system and it's components operational temperature within specifications for functionality, long life and reliability. However, the cooling systems themselves require even more electrical power to operate. The result of this combined computing and cooling power load is that many data centers often use much more than 100 Watts per square foot to operate the facility. This power density is more than 10 times the density of the average office. Increasing system power demand is driving the cost of datacenter operations up as much as 25% annually and making it a significant growing consideration in the total cost of ownership (TCO) for computing equipment. It is estimated that within five years, it will cost $4 million a year to cool an average data center; that cost is up from roughly $1 million today. Some companies spend about 10 percent of their entire power budget on power to keep data centers cool enough for reliable computer operation.

Similarly, the cost of managing the power resource expenditure is problematic. As the ability to consume power exceeds the ability to reliably provision it, some systems may be pressing the envelope of acceptable operations, thereby creating a more fragile and vulnerable system. When operating at the edge of a system's capacity even very small power problems lasting a fraction of a second may cause problems that can take many hours of precious operations staff to recover.

Storage devices can occupy as much as 75% of the floor space in computer centers; making storage in many systems the biggest single load in the datacenter. The total world wide information volume generated annually is about 1.5 exabytes ($1 \times 10^{18}$), and is growing at an exponential rate. A more recent accelerator to this information volume is the wealth of analog information and rich media which are increasingly being managed using digital facilities. Naturally, there are also new and increasingly available ways to capture and generate higher and richer definition information within digital systems. It is estimated that 93% of rich media content is now born digital; occurring first in a digital format.

It is observed that the densities for magnetic disks have increased more than 60% a year since 1990. The shipped mechanical hard drive capacity is more than doubling every year. The cost for a gigabyte of storage on disk drives is declining much faster on magnetic disks than it is on optical media or tape. In 2004, a 3.5" advanced technology attachment (ATA) drive storage will be cheaper than super digital linear tape (SDLT) tape cartridge storage. Industry rules of thumb have suggested that there has been about 10 times as much storage on tape as on hard drives. This fraction has been falling dramatically as more and more data is maintained online in spinning magnetic media in the form of mechanical hard drives. This spinning media based data is decommissioned very slowly compared to its online growth. Consequently, both old and new data is being placed and maintained on spinning mechanical drives. Keeping data on hard drives has several advantages beyond price such as being quicker to access, of more consistent methods and much more versatile to use than tape drives. Additionally, there are generally operational difficulties common to tape backup and near-line schemes such as their handling, maintenance, and related costs.

The cost of managing storage hardware generally ranges from two to ten times its acquisition cost. The fastest growing segments of the storage markets seem least equipped to manage this growth. Usage on microcomputer based operating systems may generate now more than 80% of the new digital storage demand, but offer storage management tools that are years behind standard mainframe tools. A typical storage administrator can manage from 400-600 gigabytes of disk storage on micro and distributed platforms versus the more than 40 terabytes on a mainframe. Further, these mainframes have operated at much lower power per square foot requirements. When replaced with these more popular micro computer system solutions, the updated computer configurations challenge the capability of the legacy facilities and make the replacing systems more susceptible to heat and power related failures. New techniques for power and thermal management of computer system facilities is clearly desirable.

Although storage power management for mobile systems has seen many advancements, the fundamental principles and techniques underlying the roles and deployment of servers with respect to power management have lagged. Server storage power controls which can manage data loads and growth are virtually nonexistent.

In most servers, the data accessed daily is a very small percentage of the total data available online within the system. Some estimates are that over 90% of digital information activity occurs to less than 5% of the online storage. Stated another way, most of the data maintained and available online at great expense is only rarely accessed. As a result, most of the data on spinning drives can remain unaccessed for months.

Thus, there is a need to provide operations, budgeting and management schemes for servers to manage the expenditures in power, thermal control and hardware with current and future systems as data requirements continue to grow.

SUMMARY OF THE INVENTION

The present invention defines a new class of managed server storage resource that complements conventional high performance online storage, offline tape and near-line optical subsystem storage. In one embodiment, this new class is composed of hard drives that are transitioned to lower power configurations following targeted requests. For example, a frequently accessed file or data object would be maintained on high performance constantly spinning hard drives. A file or object seldomly accessed that resides on a high performance hard drive may be directed to be stored on a power controlled hard drive. The power controlled hard drive may be spun down to some lower power state in order to achieve appreciable power savings. Exemplary advantages include a disk drive input power savings, a reduction in cooling power savings, and a reduction in acoustical noise. A commensurate economic saving may also result from the reduction in resource wear and requirements for replacement or maintenance of the disk drive system.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

Figure 1:
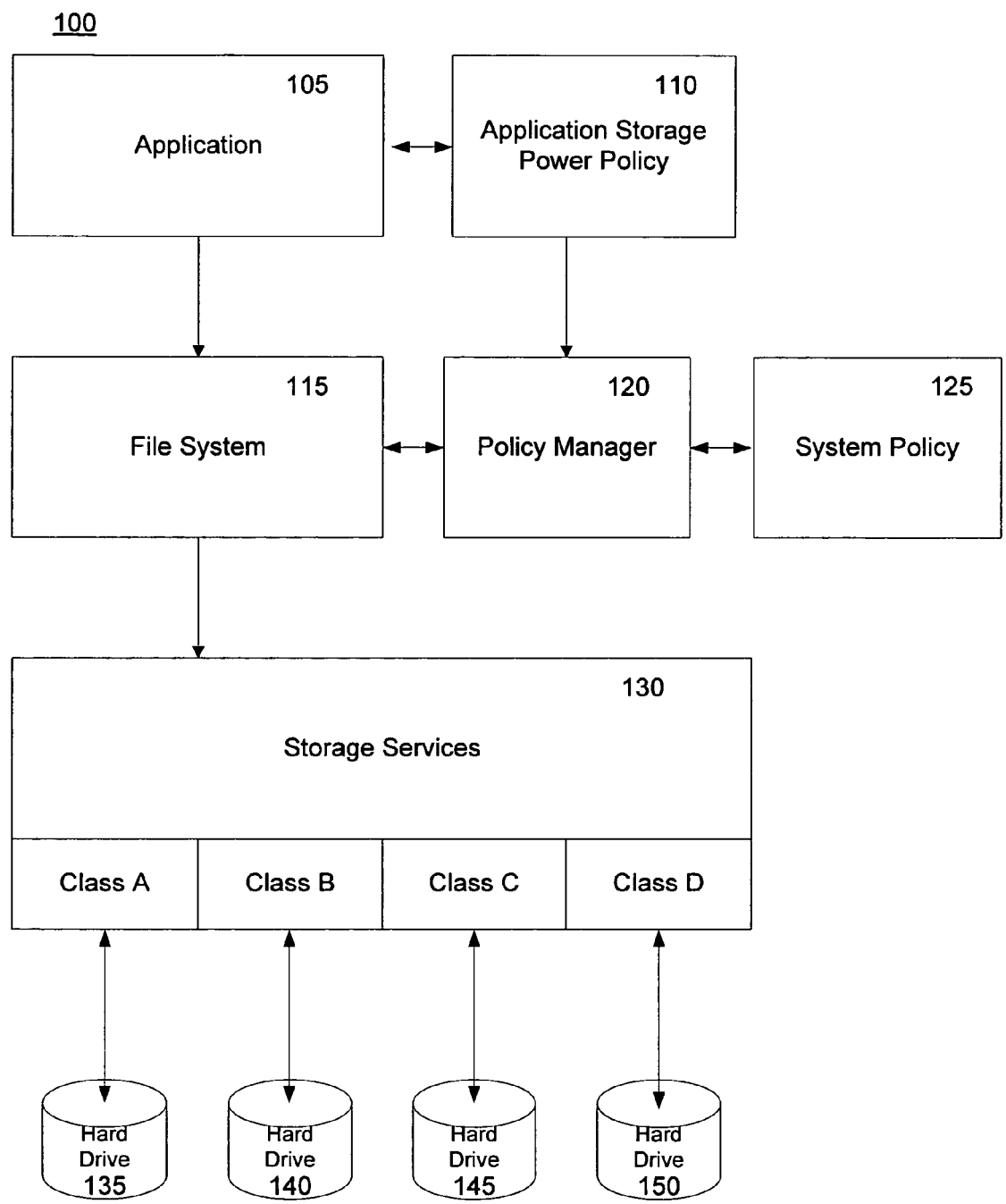
FIG. 1 is a block diagram of an exemplary power managed computer system which may be used to manage power, thermal, and acoustic aspects in accordance with the present invention.

The invention includes a method and apparatus for data distribution, directed placement and migration across managed power stated domains. Aspects of the invention control latency, power, thermal, noise and monetary economics for differential data sets on server systems. Aspects of the invention manage the cumulative energy profile for a server and extend divergent power budgets to more granular data objects. A data set may be comprised of one or more data objects, and a power domain be comprised of a set of one or more power stated drives. The present invention is directed to server systems and drives utility across differentiated high performance or high power or higher cost storage subsystems from lower power or lower cost storage facilities. The methods automate the placement, distribution and migration of data across differential classes of storage configurations. High performance, higher cost spinning hard drive configurations may be optimized for storing a first set of data and a more economical or more aggressively power controlled hard drives optimized for storing a second set of data. The higher performance hard drive configuration is continuously spinning and servicing highly demanded information while the power controlled hard drive sets are utilized for the high capacities of lower demanded data.

In one embodiment, several classes of storage domains could be configured within a system. The properties associated with individual storage transactions provide input to a policy facility that associates or directs information to be stored within particular storage classes. Policies describe thresholds and circumstances that are evaluated to discern the desired allocation of data with different properties to different storage devices thereby effecting improved power, thermal, operational and other resource economics. The first set of data may be associated with one or more data properties or access conditions and the second associated with another combination of properties. The policy infrastructure supports both system level and application specific semantics.

There are very many potential data and situational properties that can be associated with information as it flows through a transactional system. Examples of data properties could be who the creator or owner of a file is, who the consuming user or groups are, what the transaction date and time may be, as well as payment details. These contextual attributes provide a richer basis to help empower such a policy driven facility. Policies describe conditions which are evaluated by the policy engine. An operator can define new policies that utilize combinations of properties available at the system or even application level. Actions to be taken upon policy evaluation can utilize existing service functionalities natively available within the system as well as be extended by new programs or scripts. When the conditions of the policy are met or not met the policy describes what actions the system should take relating to the associated information. Under one or more exemplary conditions, the first set of data includes data that may have been requested at a rate or frequency above a predetermined threshold, or after a predetermined file age, or after a predetermined last access date. The second set of data includes data that has been requested at a rate below the predetermined request rate threshold, or before a predetermined file age, or before a predetermined last access date. The policy aggregation may direct the first set of data to be stored on high powered spinning hard drives. The policy or collection of policies may direct the second set of data however to be stored on the power controlled hard disk drives and thereby saving the power consumed by high performance operations. This direction could also reduce the thermal and acoustic noise dissipation related to high performance work and power expenditures.

Exemplary Embodiments of the Invention

FIG. 1 is a block diagram of a computer system 100 endowed with power managed storage subsystem which may be used to improve the power, thermal, and acoustic aspects consistent with the present invention. A software application 105, such as, for example, an e-mail service or a video and music jukebox application may have associated with it application policies 110 for directing data storage. The application policy 110 may provide file or other object and transaction rules to a policy manager 120. The application policy 110 would be able to define power management directives based upon semantics understood within the application 105 like email sender and mail subject descriptions that might not be available to the file system 115 inherently. The policy manager 120 interacts with the underlying file manipulation system 115 of the storage power managed computer system 100. The computer may also support a file system level policy 125 that describes actions to be associated with properties available to the file system. These policies can be generally applied to information coming from multiple applications that may each have their own additional application level policies. The file system 115 may be the file system resident in an operating system or other file manipulation system function hosted within the system.

In normal use, the application 105 interacts with the file system services 115 to access files as needed via the underlying storage services 130 of a computer system. The file system's services as depicted here may also represent other object management or database services like a SQL record management facility. The storage services 130 normally access the requested files or objects via access to various hard drives 135, 140, 145, 150 connected to the storages services 130. The storage services may be local to the system or constituted remotely within Storage Area Networks (SAN) or Network Attached Storage (NAS). Power management directives will be communicated to the remote storage services which will implement the appropriate storage optimizations. The files or other objects stored in the various hard drives are accessed in accordance with the needs of the application 105 and parameters established by the system administrator.

The policy manager 120 implements the application policy 110 and system policy 125 rules for the maintenance of the files and other objects by evaluating object properties and applicable rules of operation. The policy manager monitors the transaction activity and status of files and other objects accessible via the file system 115 the policy manager is able to advise the file system and other platform services like database managers on how it should apply storage resources. The policy rules may describe conditions that allow differentiated classification of the files managed by the file system to permit an extended power management scheme to be implemented. In one embodiment, the various hard drives of FIG. 1 are segregated into distinct classes which are under the influence of power management techniques. For example, Class A may represent a class supporting or optimized for frequently accessed or high response sensitive data. Correspondingly, the Class A hard drive unit 135 may be a high performance hard drive that is maintained constantly spinning to provide immediate and reliable high performance access to files or other objects. This high performance hard drive may be the kind that is most desirable for storing and retrieving data and may be commensurately of high value or in need of lowest access latencies. The expense appropriate to this type of high performance drive may economically limit the amount of Class A storage that can be placed in a system. According to aspects of the present invention, only data that is in critical demand or very frequently accessed is stored via the Class A storage type so as to take advantage of its high performance capability to selectively enhance system performance with regard to it's high associated expenses.

Class B storage may be a lower performing storage resource as compared to the Class A storage in terms of speed. Class B may also have the characteristic of higher capacity, density, lower rotational speed per drive or other costs per unit of storage. Where Class A storage may provide the highest performance, Class B may provide a combination of lower speed and price but high capacity and cost efficiencies for a unit of storage. As the overall performance economics of the Class B drive 140 may be lower than the Class A drive 135, the Class B drive can be economically acquired in even greater quantity and thus may represent a larger capacity than the Class A drive. As a result, the policy manager 120 may use the Class B drive for data that is accessed less frequently or with less intense response requirement than the data stored in the Class A drive and offer better economic efficiencies.

Class C storage may be the same or a lower performance of storage as compared to the Class B storage. It is assumed that the Class C drives 145 can be acquired economically and may be spun down to save power. For example, a difference between a Class B drive 140 and Class C drive 145 is that the Class C drive is normally without power because its data is seldomly accessed and the Class C drive need not be powered on between accesses. Consequentially the response to data on the Class C drive may be slower than the drive Class A and B drives that are maintained spinning. The activity to C class drives should be managed to not cause lifespan problems from excessive spin-up cycles. Class C drives may implement technologies like load ramps that minimize the impact to drive life from power cycling events. The major savings becomes evident in the savings of input power to the Class C drives, thermal energy output and cooling savings, as well as acoustic noise reductions because of the low duty cycle implied in the Class C drive operation.

Class D storage may be the same or lower in performance than the Class C storage. Class D storage is intended for drives 150 that are normally left off because the data may be archival data and is rarely accessed at all. Their activity is so low that the power cycling wear is inconsequential to the planned service life of the storage device. Alternately, a Class D drive 150 may be implemented for data that is used as backup or stand-by storage for the computer system. Class D drives 150 desirably meet the needs of the longest term, lowest performance, lowest power input and most economical storage needed by the computer system. Although four drives of various performance levels are described in accordance with the present embodiment, it is contemplated that any number of drives with the same or varying performance levels can be implemented in configurations accordance with the present invention. For example each class may actually be one or more arrays of drives configured with varying RAID (Redundant Array of Independent Disks) attributes to tune performance, reliability and economic properties.

The policy manager 120 desirably implements the application policy 110 of application 105 with respect to data storage. By associating the files or other objects acted upon by the application 105 into the various classes of storage, a saving can be realized in input power, thermal dissipation, thermal management, and acoustic noise. For example, the policy manager 120 may examine the access rate of files or other objects of the file system and direct the newest or most often accessed files or objects to the Class A storage because Class A storage offers the highest performance of any of the hard drive configurations. Files or other objects which are accessed less frequently may be directed to the lower power, lower performance drives of Class B. Similarly, files or other objects which fall below some threshold of access may be directed to reside on Class C which can be spun down, thereby accommodating data which is less frequently addressed in order to save power, reduce the need for thermal rejection capability, and suppress overall acoustic noise. Finally, for example, very old and archive files and objects may be directed towards Class D storage by the policy manager 120.

The policy manger 120 may use access rate as an indicator of what class the subject file or object should be directed towards. In another embodiment, other metadata associated with file may be used as an indicator of appropriate classification. Metadata such as file creation date may be used where the most recently created files may be kept in the fast access categories of Class A or Class B storage. Older file creation dates may be an indicator that the subject file or other object should be provided to the Class C or Class D storage with a corresponding power, thermal dissipation, and noise savings.

In another embodiment, metadata associated with last access date may be used by the policy manager to classify files or other objects. Here, the most recently accessed files may be preferably directed towards the higher performance, higher power consuming drives of Classes A and B while files with older access dates may be preferably directed towards the lower power dives of Classes C and D. There is a very large and growing base of metadata properties that can be used within the embodiments of this type of power management scheme. Other examples are the owning or sourcing user or application; the consuming or communicating parties or groups; the file types and it's associated encodings; attributes of a file's fully distinguished name; content intrinsic detail like document subjects and key words, resolution and bit densities, compression and encryption algorithms, and financial properties of associated transactions. In general, it may be noted that classification of data may be based on the characteristics such as a fully distinguished file name, file size, creator, owner, consumer, groups, distribution lists, access control list detail, certificates, signature attributes, protocols, content resolution, encoding technique, encryption technique, key properties, internal subjects, keywords, content tags, assemblies, associations to other files, replication, caching, directory or related database extensible properties.

It should be recognized by those of skill in the art that any one or more of the Classes may be migrated to another class. For example, a high performance Class A drive can be downgraded to a Class B or C hard drive if conditions permit. Alternately, a Class B or C hard drive may be upgraded to a Class A high performance hard drive.

Figure 2:
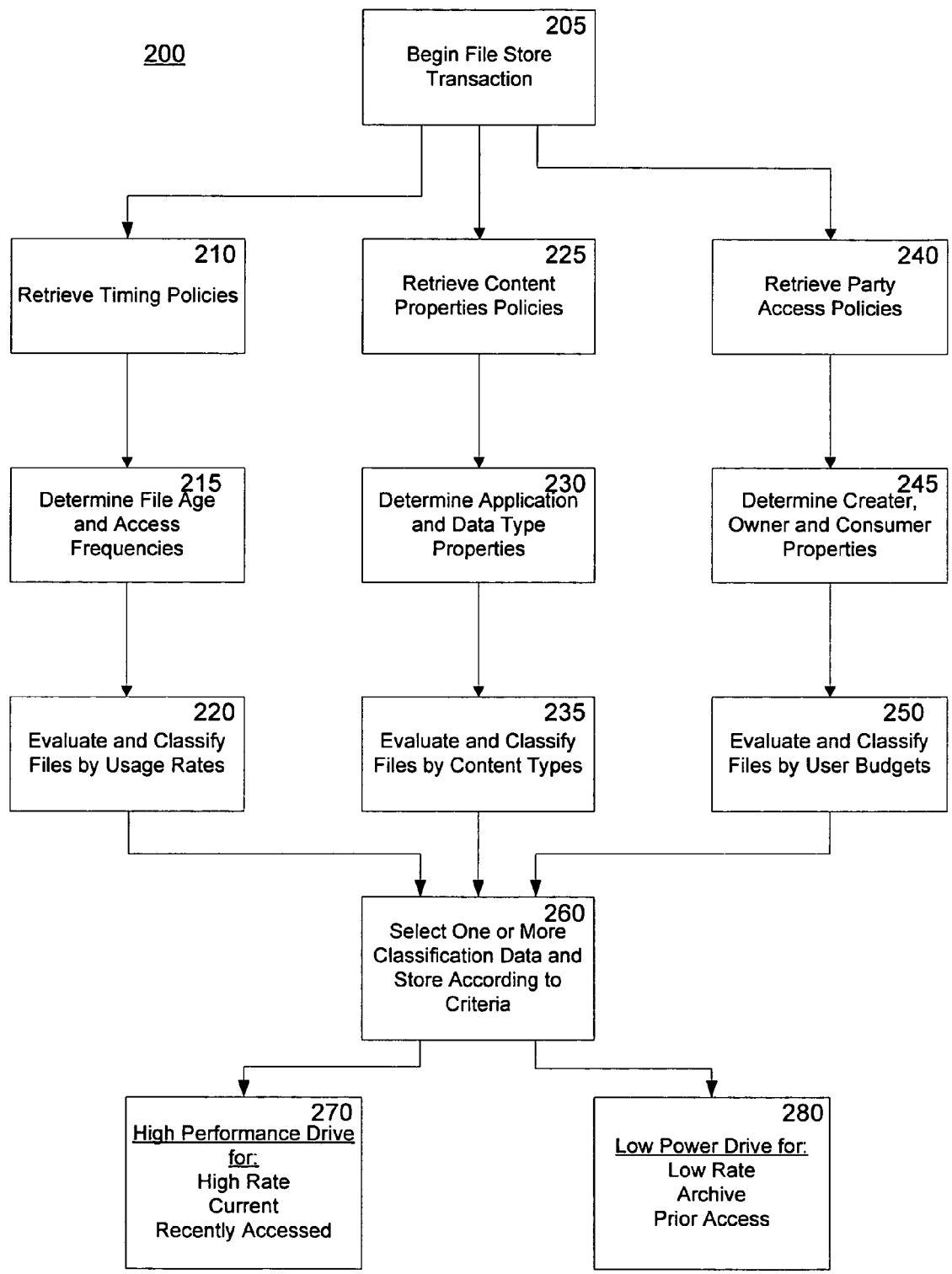
FIG. 2 is a flow diagram depicting an exemplary method of transaction management in accordance with the present invention.

FIG. 2 represents a general flow diagram of a process 200 of the present invention for a computer system, such as that described herein with respect to FIG. 1. Policies are defined that the system will use in storage policy evaluation events associated with user driven storage events like the creation, reading or modification of a file; as well as evaluations driven by configured time dependent events like scheduled parsing after business hours. The process 200 starts (step 205) by initiating at least one classification scheme (here, one or more of three classification schemes, although any number of classification schemes are contemplated). One classification scheme may be initiated by evaluating timing sensitive settings and thresholds for properties of a data object's request transaction. The system would identify appropriate timing driven policies (step 210) that would apply to the storage transaction. The data store is inspected and monitored to capture properties like the rate of request over some defined unit of time, such as minutes, hours, days, weeks, etc. As files or other objects are accessed, their request rate is calculated and maintained. The system would identify the timing attributes (step 215) that are associated with the data object and transaction that are pertinent to the policies identified in step 210.

In step 220 the system evaluates the properties of step 215, such as request rate data, against the policies of step 210, such as a threshold request rate, and the file or data object is recommended for a particular storage classification (step 220). In this example, this classification may differentiate files or other data objects that have a relatively high request frequency from those of a lower demand. Those files or data objects may be items whose request rate is in excess of the request rate threshold identified up in step 210. The recommended classification for the file or objects are available as input data for step 260, described further below.

Another classification scheme may be initiated by evaluating content policies that apply to file naming, typing, encoding, key words used, dominant colors and other content characteristics within a file. For example a policy applying to an image file of type jpeg may be identified or retrieved (step 225) for the file or other objects of the associated transaction. The data would be investigated to determine it's associated content type. This may be by simple file extension evaluation (e.g. jpg) or more exhaustive investigation of the actual data and encoding information of the or data object (step 230). Some of these investigations may be performed at any time. For example, the data may be interpreted only during user accesses or it may be triggered for analysis during low system activity periods. The metadata thus obtained may be evaluated against the threshold types of step 225 and the file or other object is recommended for classification (step 235). The classification rules of step 225 may be combined with other content properties like file size or parts of it's fully distinguished name (for example in a subdirectory chain coded 'personal' to differentiate from business data) to define a aggregate content recommended classifications differentiating big personal pictures from business images. These content classifications are available as input data for step 260, described below.

Another classification scheme may be initiated to evaluate the conditions of properties of users or transaction parties. The system would identify the policies to be evaluated against properties related to the content creator, owner, consumer and the groups that they may be associated with step 240 of files or other objects of the transaction. The property data may be inspected to determine the parties involved in the transaction (step 245). The metadata would be evaluated against the policy conditions or thresholds of step 240 and the file or other object may receive a classification recommendation (step 250). The classification may yield a file or other data object distinguishing for one owner as distinct from files or data owned by another user established by rules identified in step 240. The classification recommendations for the file or objects are available as input data for step 260.

At step 260, one or more of the classification recommendations data sets from steps 220, 235, or 250 may be selected or aggregated for subsequent data storage directive use. Step 260 allows for scenarios where multiple thresholds have been met and even conflicting rules may apply, delivering clear directive as to what storage class should be implemented for the transaction. The process 200 then may store the files or other data objects (step 270) that have been classified for high performance budgeting into a high performance hard disk. A high performance, high power hard disk may be one, for example, that corresponds to a high speed hard disk as that described as belonging to Class A of FIG. 1.

The process may then place other data in appropriately power managed hard disk storage subsystems by using, for example, a lower classification drive as in step 280. Files or other data objects that have been classified as low rate, old, or prior to a threshold access date, may be stored on power restricted disk storage. Power restricted disk storage may be that which, for example, corresponds to a low speed access hard disk that has a lower power requirement than high speed access drives. Such a drive may correspond to one or more of Classes B, C, or D from the drives of FIG. 1.

It should be noted that the flow diagram of the process of FIG. 2 represents an example implementation of the aspects of the current invention. If multiple policies and thresholds were established for storage transactions, then multiple classifications may be accomplished, allowing files to be classified and directed towards multiple levels of power-restricted hard disk storage such as is represented in the example of FIG. 1. Also note that fewer classes of drives may be accommodated by the invention.

Figure 3:
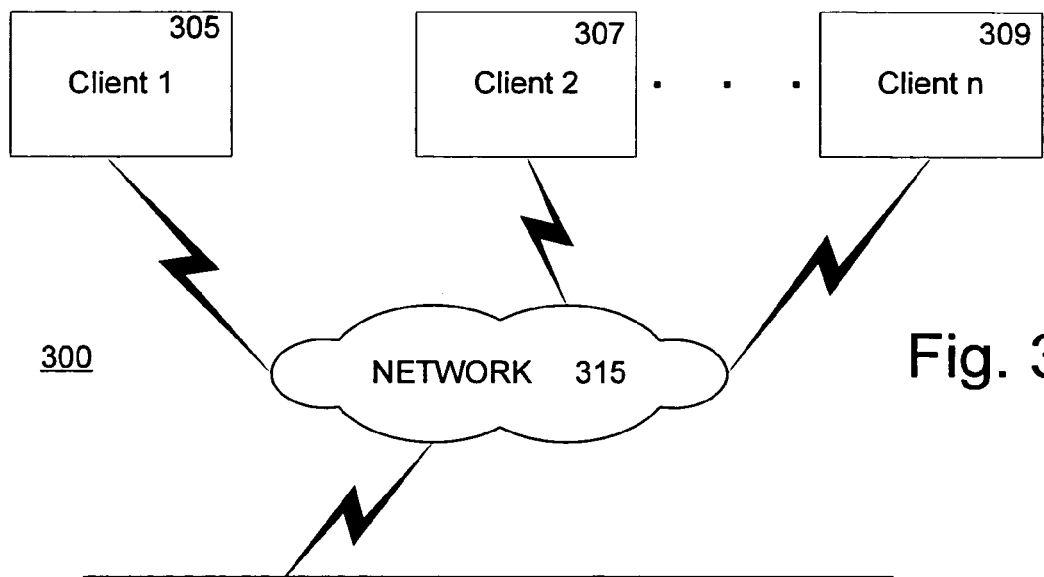
FIG. 3 is a block diagram of an exemplary e-mail server in which aspects of the present invention may be implemented.

FIG. 3 illustrates one embodiment of a system 300 in which a networked e-mail server 320 uses aspects of the invention. Client computing devices 1, 2, and n (305, 307 and 309) have connections to a network 315 which provides access to a server 320 which provides e-mail services for the clients. It is contemplated that any number of client devices (up to n) can access the network 315.

The client computing devices, which desirably have e-mail tools and network connection capability, connect to the server network interface 321 via the network 315. Once network communications is established, the e-mail application 322 in the server 320 may access, among other things, a resident file system 324 to accommodate the storage and retrieval of files and other objects associated with the e-mail application.

According to aspects of the invention, an e-mail storage policy 323 may be used to provide rules to a policy manager 325 which can access the file system. The e-mail storage policy 323 may accommodate transaction properties understood within the email application 322 but not directly discernable by the file system 324. These policy guidelines of the e-mail application may be described by the application or additionally customized by a user or system manager. The application may pass additional classifications encoding implicitly or explicitly to the file system or policy manager. The function of the policy manager is to integrate and implement the rules of the storage policies 323 by affecting the storage of files, portions of the files and other e-mail related objects. Through this method the file system 324 can direct information to the appropriate storage resource based upon information not otherwise known to the file system. The email application can be aware of properties like who the sender and recipients are, what the subject is and how email objects and attachments are arranged within files. Some mail systems aggregate multiple data objects into a single file or other collaborative set of files and without the involvement of the application 322 it can be difficult to separate mail objects appropriately. An example of this would be where a database manager may platform storage policies such that an email database has portions on high performance storage and other portions on power managed storage resources. The implementation of the policy rules may yield savings in power because of the various types or classes of storage used by the server 320.

The storage services 326 of the server 320 may represent functionality of an operating system or some lower tier of service which can access different storage media. Through the enhancement of application policy and property evaluation, enhanced discrimination can now be extended to the storage services to better influence a more optimal expenditure of resource. In the example of FIG. 3, the storage services 326 functions to control access to a high speed drive 327 and a lower performance powered controlled drive 328. The high speed drive 327 may be a state of the art, low access time, high spin rate magnetic disk drive that is always on when the server is powered. This drive is desirably used to access the bulk of the files and other e-mail related objects that are read or written often during normal operation. The powered controlled drive 328 may be a drive that can be operated in a more power efficient manner. Those operations may include spinning down the drive to save power, powering the drive off between accesses or other scheme as described above, for example, with respect to FIGS. 1 and 2. The low powered drive 328 may now be used to store low priority and archive email information more economically within the system. Power management directives may apply directly for physically attached storage devices, or may be tunneled through to other storage managers potentially constituted in a Storage Area Network (SAN). This SAN controller may then issue the particular power methods to the physical storage devices to yield the desired system power savings.

In the e-mail application embodiment of FIG. 3, the policy directives and metadata characteristics from the file system 324 are now extended with the policy driven directives and metadata from the email application 322 and may be used to appropriately enforce threshold for each data object to be directed to the appropriate powered controlled drive 327 and 328. The policy manager 325 performs the metadata comparison against the established thresholds as described, for example, with respect to FIG. 2, and advises the file system as to how data objects should be managed by the storage services 326. Important and recent email objects files can be placed or may remain on the high speed drive 327 whereas seldomly accessed files or other objects may be placed and migrated into the power controlled drive 328 as appropriate.

In implementing the exemplary e-mail server of FIG. 3, multiple application policy rules may be combined along with the threshold events described with respect to FIG. 2. When a single file or other object is subject to more than one threshold event, a rule that places the rules in a hierarchy may be implemented by the policy manager to eliminate contention for the direction of an object or file to a storage location. For example, if an e-mail record or file is subject to an originator analysis as well as a creation date analysis, there may be a mixed result as to where the record or file should be stored. If the record or file originated from a critical source or with an important subject matter, then the file should be placed into the high speed drive storage 327 for quick access. However, if the file was created with lower priorities or with a time before the threshold age date, then the file should be placed in power controlled storage 328 for power savings. Thus contentious result may be overcome by the policy manager by establishing rules specific to the system 300 that allow properties like source and subjects to override the result from the file age threshold test. Such rules may be system specific and may incorporate any or all file placement analysis determinations.

Figure 4:
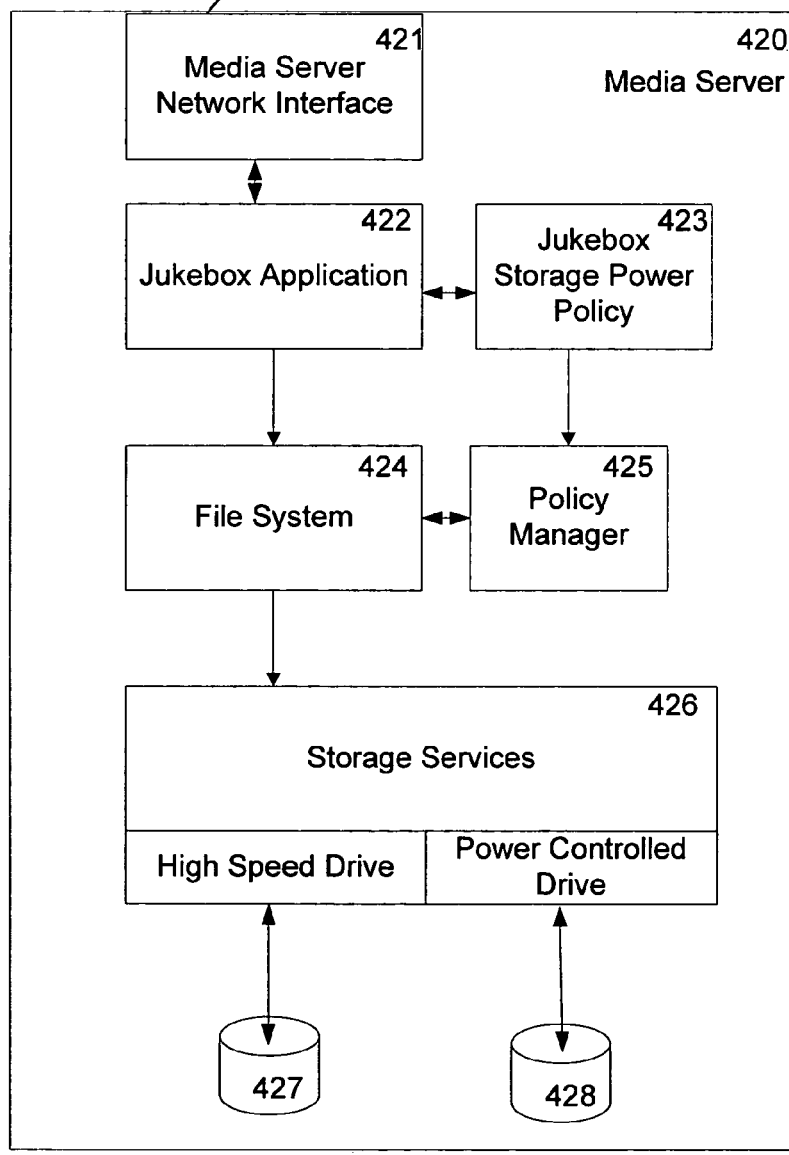
FIG. 4 is a block diagram of an exemplary streaming media or jukebox server in which aspects of the present invention may be implemented.

FIG. 4 illustrates embodiment of a system 400 in which a networked streaming media or jukebox server 420 uses aspects of the invention. This system is similar to that described above with respect to FIGS. 1 and 3, but instead implements jukebox services for audio and video media content. This server may use conventional file access protocols like SMB/CIFS, FTP and HTTP as well as timing sensitive streaming media protocols like RTP/RTSP. Client computing devices 1, 2, and n (405, 407 and 409) are connected to a network 415 which in turn provides access to a server 420. Any number of client devices can access the network 415. The server 420 provides jukebox services, such as the distribution of audio or video files for the clients.

The client computing devices, which desirably may or may not have special media access authorization, digital rights management capabilities, media player software and network connection capability, connect to the server network interface 421 via the network 415. The jukebox application 422 in the server 420 may access, among other things, a resident file system 424 to accommodate the storage and retrieval of audio or video objects.

In a conventional audio or video jukebox, for example, all the drives may be spinning constantly regardless of the number of requests or popularity for a particular song or movie. That is, all the music or videos get the same storage type. In accordance with the present invention, frequently accessed titles can be stored on high performance drives, and less popular or less frequently accessed titles can be stored on power controlled drives which may be lower initial performance from the powered off drives.

As the quality of high definition media increases the amount of required storage capacity increases significantly. The amount of media being made available on digital facilities is growing at an amazing pace. The cost associated with maintaining it on spinning hard drives is very high. A beneficial characteristic of a power managed drive is that though there may be a very short latency associated with powering up the drive, once it is operational it's data transfer rates may be on par with the always powered drive. Though there may be a few seconds delay initiating a movie request it is a very small percentage of the over all transaction which may last hours. To maintain a large number of titles the high powered opportunity cost would be extremely high.

A jukebox storage policy 423 may provide rules to a policy manager 425 which can influence the file system storage strategies. The jukebox storage policy 423 may accommodate the policy guidelines of the jukebox application provider and may be additionally be user-customized. The policy manager implements the rules of the storage policy 423 by affecting the storage of audio and video files.

In one aspect of the invention, many drives may be unified into a single logical storage facility (such as components within a single storage class) hosting many titles. Purposeful techniques may be employed to organize these drives to minimize the powered event impact. For example, a conventional stripping algorithm may distribute parts of a file across multiple drives. Though stripping may have throughput advantages, it has a negative power and wear impact to the life of the drives as multiple drives may be spun up to service an individual file or title request. In this embodiment a storage class may define new volume spanning techniques that would minimize the need to spin up multiple drives to service an individual title request.

Similar to the storage services 326 described with respect to FIG. 3, the storage services 426 may represent functionality of an operating system or some lower tier of service which can access different storage media. In the example of FIG. 4, the storage services 426 controls access to a high speed drive 427 and a lower performance powered controlled drive 428, similar to the drives 327 and 328 described above as well as managing a storage class that minimizes drive impact for large repositories of potentially large media content.

As in the e-mail application embodiment of FIG. 3, the metadata characteristics of file release or creation date and last access date or popularity metrics may be used along with an appropriately set threshold for each to determine if a file or other object may be directed to the powered controlled drive 428. The policy manager 425 performs the metadata comparison against the established date thresholds as previously described. As noted above, an access rate may be measured against a threshold access rate, with frequently accessed files placed on, or may remain on, the high speed drive 427 whereas seldomly accessed files or other objects may be placed into the power controlled drive 428. This concept supports the need to migrate media as it drops in popularity to more power efficient storage. With exception to backup scenarios, it is contemplated that the policy manager 425 may include location determination software to reduce or eliminate the possibility that an audio or video file is present on both drives (427, 428) at the same time, as described with respect to the FIG. 3 embodiment.

Figure 5:
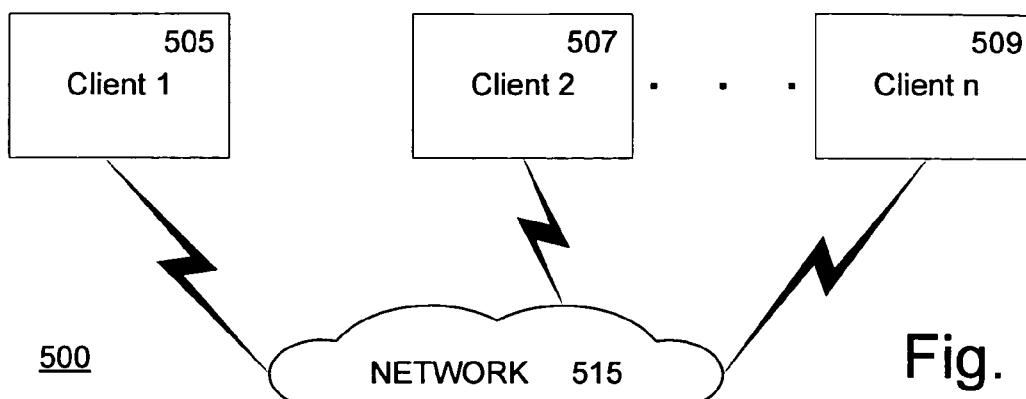
FIG. 5 is a block diagram of an exemplary World Wide Web content server system in which aspects of the present invention may be implemented.
Figure 5:
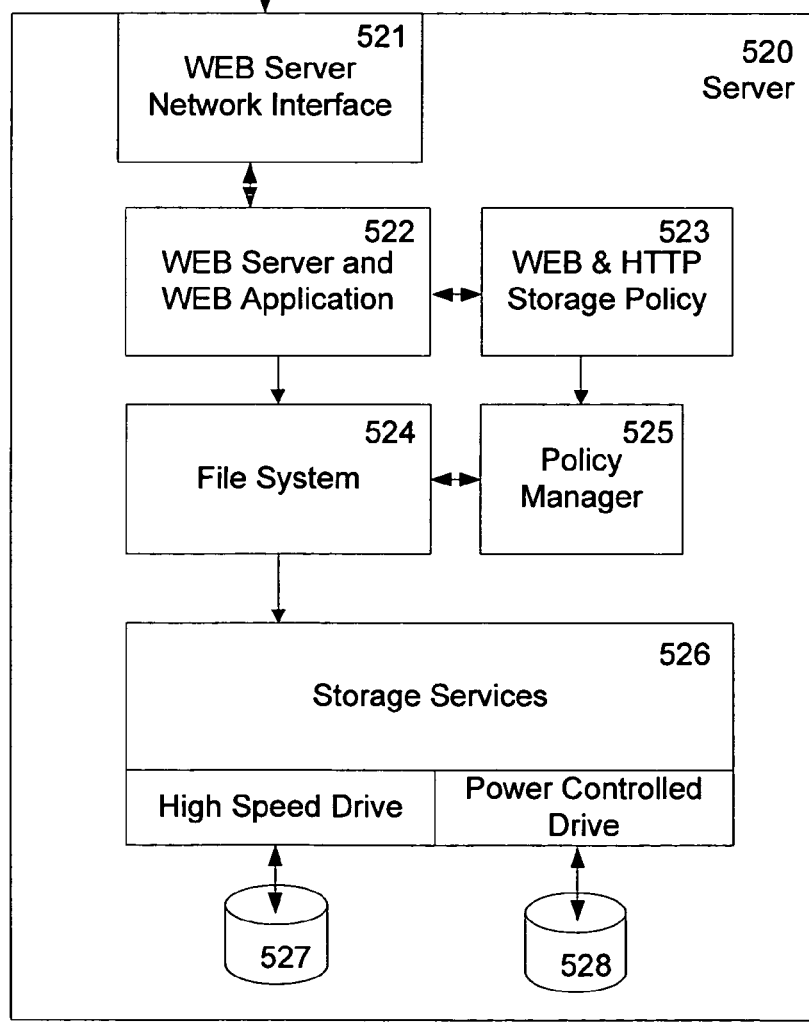

FIG. 5 illustrates a further embodiment of the present invention which embodies a system 500 comprising a networked World Wide Web server system 520. As in the previously described examples, client computing devices 1, 2, and n (505, 507 and 509) have connections to a network 515 which provides access to a server 520. In this example, the server 520 provides document management and distribution services, such as the distribution of document files for the clients. It is contemplated that any number of client devices (up to n) can access the network 515.

The client computing devices, which desirably may not have specific document access authorization software beyond a conventional browser and network connection capability, connect to the server network interface 521 via the network 515. The Web server and it's hosted applications 522 in the server 520 may access, among other things, a resident file system 524 to accommodate the storage and retrieval of various types of documents.

Current Web server systems may incur the same cost/bit of storage regardless of document hit frequency. Application of the current invention to a Web server system may place frequently hit documents and sourcing databases on high performance drives, and put less frequently hit documents on power controlled drives which may be low performance drives or other lower power alternatives. A common but optional practice with Web serving is to position a proxy cache (529) between the Web server 520 and clients (505, 507 and 509). Proxy caches may commonly be positioned on either side of the network 515. In either case, one of the roles of the proxy cache is to host replicas of cacheable content from the Web server and to serve it to clients without having to go back to the Web server in each case. By advantaging proxy caches the Web server could desirably implement a policy that directs cacheable content to be stored on power managed storage classes.

A Web storage policy 523 may be used to provide rules to a policy manager 525 which can access the file system. The document storage policy 523 may accommodate the policy guidelines of the document manager application provider. The policy manager implements the rules of the storage policy 523 by affecting the storage of documents. The Web applications may not need their own explicit external policies, but may in this example, encode HTML or XML tags within their documents and data objects that pass additional metadata to the Web server and elicit invocation Web server application policies.

The storage services 526 of the server 520 may represent functionality of an operating system or some lower tier of service which can access different storage media. Here, the storage services 526 controls access to a high speed drive 527 and a lower performance powered controlled drive 528. These drives are desirably similar to those drives 327 and 328 described above. The high speed drive 527 is desirably used to access the authoritative non-cacheable files, common cache missed data and objects that are that are written to during normal operation, as well as the databases that are used to generate dynamic data.

As in the e-mail application embodiment of FIG. 3, the metadata characteristics of file creation date and last access date may be used along with an appropriately set threshold for each to determine if a file or other object may be directed to the powered controlled drive 528. The policy manager 525 performs the metadata comparison against the established date thresholds, as previously described. In addition, an access rate may be measured against a threshold access rate. Often accessed files can be placed or may remain on the high speed drive 527 whereas seldomly accessed files or other objects may be placed into the power controlled drive 528. The policy manager 525 may include location determination software to reduce or eliminate the possibility that a given file is present on both drives (527, 528) at the same time, as described above. Other server applications may also be accommodated by the present invention.

Figure 7:
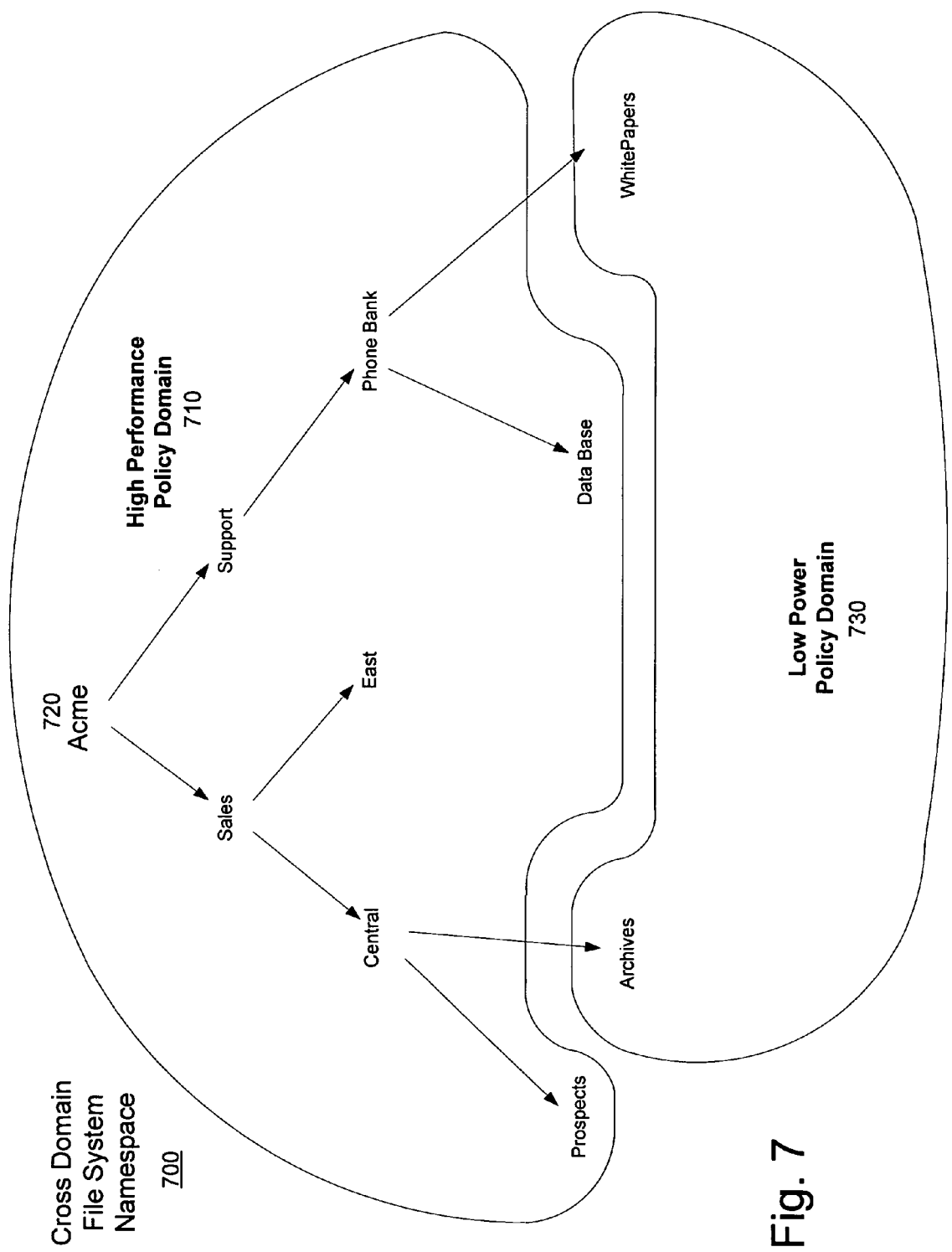
FIG. 7 is a block diagram showing an exemplary cross domain namespace over which aspects of the invention may be implemented.

FIG. 7 represents an exemplary approach for an integrated namespace 700 that crosses multiple power managed storage domains. The naming scheme (720) for hierarchical organization of the file system allows for purposed segmentation and organization of files with meaningful fully distinguished names. For example an old archive document may have a name like: Acme\Sales\Central\Archives\1999forecasts.doc. The system 100 may be configured such that a high performance namespace domain 710 is serviced by high performance drives 135 and a low power domain 730 is serviced by lower powered drives 145 or 150. Directories for Archives and White Papers are in this example associated with the low power domain 730. As users place documents into their appropriate subdirectories they are automatically stored on the appropriate storage class of hard drives. As such the 1999forecasts.doc would be placed by the system on a power managed drive maintaining it's availability, but minimizing power expense for archived data.

Exemplary Computing Device

Figure 6:
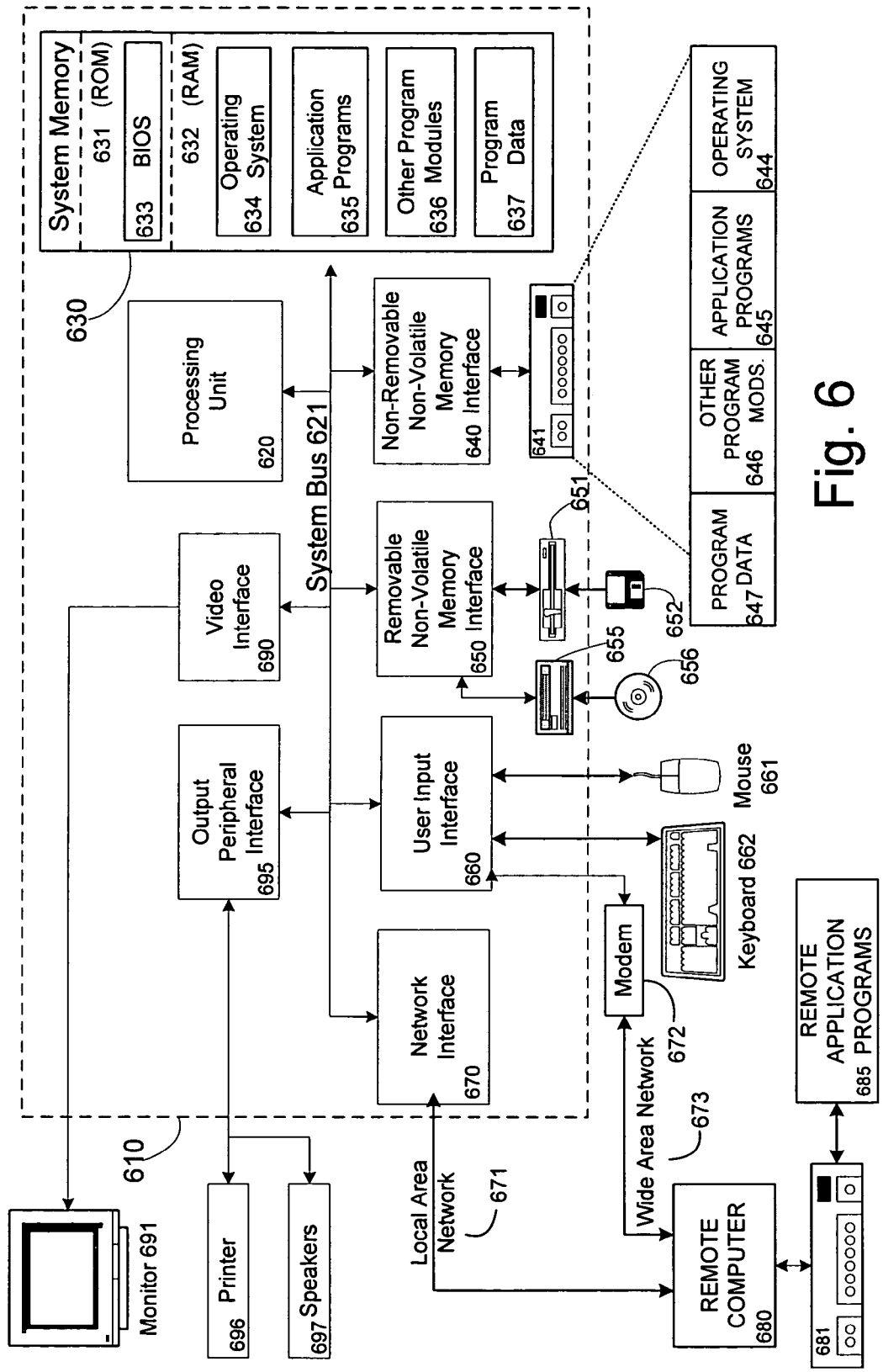
FIG. 6 is a block diagram showing an exemplary computing environment in which aspects of the invention may be implemented.

FIG. 6 and the following discussion are intended to provide a brief general description of a suitable computing environment in which the invention may be implemented. It should be understood, however, that handheld, portable and other computing devices and computing objects of all kinds are contemplated for use in connection with the invention. Thus, while a general purpose computer is described below, this is but one example, and the invention may be implemented with other computing devices, such as a client having network/bus interoperability and interaction. Thus, the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation according to the invention.

Although not required, the invention can be implemented via an operating system, for use by a developer of services for a device or object, and/or included within application software that operates according to the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer configurations.

With reference to FIG. 6, an exemplary system for implementing the invention includes a general purpose computing device in the form of a computer system 610. Components of computer system 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 610 typically includes a variety of computer readable media. Computer readable media can be any available media that can be accessed by computer system 610 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer system 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer system 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6 provide storage of computer readable instructions, data structures, program modules and other data for the computer system 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer system 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus 621, but may be connected by other interface and bus structures, such as a parallel port, game port or a universal serial bus (USB). A monitor 691 or other type of display device is also connected to the system bus 621 via an interface, such as a video interface 690, which may in turn communicate with video memory (not shown). In addition to monitor 691, computer systems may also include other peripheral output devices such as speakers 697 and printer 696, which may be connected through an output peripheral interface 695.

The computer system 610 may operate in a networked or distributed environment using logical connections to one or more remote computers, such as a remote computer 680. The remote computer 680 may be a personal computer, a server, a router, a network PC, a peer device or other common network node, and typically includes many or all of the elements described above relative to the computer system 610, although only a memory storage device 681 has been illustrated in FIG. 6. The logical connections depicted in FIG. 6 include a local area network (LAN) 671 and a wide area network (WAN) 673, but may also include other networks/buses. Such networking environments are commonplace in homes, offices, enterprise-wide computer networks, intranets and the Internet.

When used in a LAN networking environment, the computer system 610 is connected to the LAN 671 through a network interface or adapter 670. When used in a WAN networking environment, the computer system 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer system 610, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

As mentioned above, while exemplary embodiments of the invention have been described in connection with various computing devices and network architectures, the underlying concepts may be applied to any computing device or system in which it is desirable to implement power controlled storage. Thus, the methods and systems of the present invention may be applied to a variety of applications and devices.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device.

While the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the invention should not be limited to any single embodiment, but rather should be construed in breadth and scope in accordance with the appended claims.

The invention claimed is:
1. A server system comprising:
a high performance spinning-type hard drive for storing data; and
a power controlled spinning-type hard drive for storing data, wherein an entirety of the power controlled spinning-type hard drive is configured for lower power consumption as compared to the high performance spinning-type hard drive; and a policy manager that assesses multiple metadata analysis of a data set to be stored into one of the high performance hard drive or the power controlled hard drive, the multiple metadata analysis including all of, (a) an analysis of usage rate metadata of the data set to be stored, (b) an analysis of content type metadata of the data set to be stored, and (c) an analysis of owner and consumer metadata of the data set to be stored, wherein the policy manager receives the multiple metadata analysis of (a), (b), and (c) and makes a determination whether the data set is to be stored in the high performance hard drive or in the low power hard drive, the determination based on rules to eliminate contention between the multiple metadata analysis, the policy manager implementing rules of an application policy and a file system policy, the application policy defining power management directives within an application, and the file system policy including rules associated with a file system;

wherein the data set to be stored is placed on the power controlled spinning-type hard drive after classification of the data into the characteristics of a fully distinguished file name, creator, owner, consumer, distribution lists, access control list detail, certificates, signature attributes, protocols, content resolution, encoding technique, encryption technique, key properties, internal subjects, keywords, content tags, assemblies, associations to other files, replication, caching, directory and related database extensible properties.

2. The server system of claim 1, wherein the power controlled spinning-type hard drive achieves a lower power consumption by spinning up the power controlled drive upon receipt of a service request and spinning down the power controlled drive after providing service.

3. The server system of claim 1, wherein the data set to be stored comprises audio or video files.

4. The server system of claim 1, wherein the high performance drive spins continuously.

5. The server system of claim 1, wherein a subset of the data set is moved to power controlled drive in accordance with a predetermined condition, the data set moved after being stored in the high performance hard drive.

6. The server system of claim 5, wherein the predetermined condition is based on at least one of the last access date of the subset of data, the current date, the number of times the subset of data has been requested in a period of time, the data size, users of the data, a file name, the data types, and internal content.

7. The server system of claim 1, wherein a subset of the data set to be stored is moved to the high performance drive in accordance with a predetermined condition, the data set moved after being stored in the power controlled hard drive.

8. The server system of claim 7, wherein the predetermined condition is based on at least one of the last access date of the subset of data, the current date, and the number of times the subset of data has been requested in a period of time.

9. A method for managing data on a server, the method comprising:

receiving a data set to be stored, the data set to be stored into one of a high performance hard drive or a power controlled hard drive;

performing multiple metadata analysis of the data set, the multiple metadata analysis including all of; (a) an analysis of usage rate metadata of the data set to be stored, (b) an analysis of content type metadata of the data set to be stored, and (c) an analysis of owner and consumer metadata of the data set to be stored;

receiving the multiple metadata analysis of (a), (b), and (c) by a policy manager; and determining, using the policy manager, whether the data set is to be stored in the high performance hard drive or in the low power hard drive, the determination based on rules to eliminate contention between the multiple metadata analysis, the policy manager implementing rules of an application policy and a file system policy, the application policy defining power management directives within an application, and the file system policy including rules associated with a file system;

wherein the step of performing multiple metadata analysis further comprises analyzing the data set according to the characteristics of a fully distinguished file name, creator, owner, consumer, distribution lists, access control list detail, certificates, signature attributes, protocols, content resolution, encoding technique, encryption technique, key properties, internal subjects, keywords, content tags, assemblies, associations to other files, replication, caching, directory and related database extensible properties.

10. The method of claim 9, wherein the step of performing the analysis of usage rate metadata comprises:

determining a storage location for the data set by comparing the request rate of the data set to a predetermined threshold;

assigning data that has a request rate above the predetermined threshold to the high performance hard drive; and assigning data that has a request rate below the predetermined threshold to the power controlled hard drive.

11. The method of claim 9, wherein the step of performing the analysis of usage rate metadata comprises:

determining a storage location for the data set by comparing the last request date of data to a predetermined date;

assigning data that has a last request date after the predetermined date to the high performance hard drive; and assigning data that has a last request date before the predetermined date to the power controlled hard drive.

12. The method of claim 9, wherein the step of performing the analysis of usage rate metadata comprises:

determining a storage location for the data set by comparing the creation date of data to a predetermined date;

assigning data that has a creation date after the predetermined date to the high performance hard drive; and assigning data that has a creation date before the predetermined date to the power controlled hard drive.

13. The method of claim 9, wherein the data set comprises audio or video.

14. The method of claim 9, wherein the data set comprises documents.

15. The method of claim 9, further comprising spinning the high performance drive continuously, and maintaining the power controlled drive in a reduced performance state unless actively accessing data stored thereon.

16. The method of claim 9, further comprising moving a subset of the data set to the power controlled drive in accordance with a predetermined condition, the data set moved after being stored in the high performance hard drive.

17. The method of claim 16, wherein the predetermined condition is based on at least one of the last access date of the subset of data, the current date, and the number of times the subset of data has been requested in a period of time.

18. The method of claim 9, further comprising moving a subset of the data set to the high performance drive in accordance with a predetermined condition.

19. The method of claim 18, wherein the predetermined condition is based on at least one of the last access date of the subset of data, the current date, and the number of times the subset of data has been requested in a period of time.

20. A computer-readable storage medium having computer-executable instructions for performing a method of managing data on a server, the method comprising:
receiving a data set to be stored, the data set to be stored into one of a high performance hard drive or a power controlled hard drive;
performing multiple metadata analysis of the data set, the multiple metadata analysis including all of (a) an analysis of usage rate metadata of the data set to be stored, (b) an analysis of content type metadata of the data set to be stored, and (c) an analysis of owner and consumer metadata of the data set to be stored;
receiving the multiple metadata analysis of (a), (b), and (c) by a policy manager; and
determining, using the policy manager, whether the data set is to be stored in the high performance hard drive or in the low power hard drive, the determination based on rules to eliminate contention between the multiple metadata analysis, the policy manager implementing rules of an application policy and a file system policy, the application policy defining power management directives within an application, and the file system policy including rules associated with a file system;
wherein the step of performing multiple metadata analysis further comprises analyzing the data set according to one or more of the characteristics of a fully distinguished file name, creator, owner, consumer, distribution lists, access control list detail, certificates, signature attributes, protocols, content resolution, encoding technique, encryption technique, key properties, internal subjects, keywords, content tags, assemblies, associations to other files, replication, caching, directory and related database extensible properties.

21. The computer-readable storage medium of claim 20, further comprising the step of spinning the high performance drive continuously, and maintaining the power controlled drive in a reduced performance state unless actively accessing data stored thereon.

22. The computer-readable storage medium of claim 20, further comprising the step of moving a subset of the data set to the power controlled drive in accordance with a predetermined condition, the data set moved after being stored in the high performance hard drive.

23. The computer-readable storage medium of claim 22, wherein the predetermined condition is based on at least one of the last access date of the subset of data, the current date, and the number of times the subset of data has been requested in a period of time.

24. The computer-readable storage medium of claim 20, further comprising the step of moving a subset of the data set to the high performance drive in accordance with a predetermined condition, the data set being moved after being stored in the power controlled hard drive.

25. The computer-readable storage medium of claim 24, wherein the predetermined condition is based on at least one of the last access date of the subset of data, the current date, and the number of times the subset of data has been requested in a period of time.

26. The system of claim 1, wherein a database is divided such that a first portion of the database, having a first set of attributes, is stored in the high performance hard drive, and a second portion of the database, having a second set of attributes, is stored in the power controlled hard drive.

27. The system of claim 26, wherein the first set of attributes comprises a first set of meta-directives and the second set of attributes comprises a second set of meta-directives.

28. The system of claim 1, wherein the high performance hard drive comprises one of a remote storage area network (SAN) device and a network attached storage (NAS) device, wherein power management directives control the storage of data across multiple storage devices.

29. The system of claim 1, wherein the power controlled hard drive comprises one of a remote storage area network (SAN) device and a network attached storage (NAS) device, wherein power management directives control the storage of data across multiple storage devices.

30. The system of claim 1, wherein the power controlled hard drive comprises one of a remote storage area network (SAN) device and a network attached storage (NAS) device, wherein power management directives are used to control power management events in storage devices.

31. The system of claim 1, wherein the power controlled hard drive is a redundant array of independent disks (RAID).

32. The system of claim 31, wherein the second set of data in the power controlled hard drive is distributed across the redundant array using a stripping algorithm.

33. The system of claim 32, wherein the stripping algorithm reduces the power up impact to a smaller set of drives upon data access operations.

* * * * *